(12) United States Patent
Zhou et al.

(10) Patent No.: US 8,396,359 B2
(45) Date of Patent: Mar. 12, 2013

(54) METHOD FOR ENGINEERING CONNECTIONS IN A DYNAMICALLY RECONFIGURABLE PHOTONIC SWITCHED NETWORK

(75) Inventors: Jingyu Zhou, Morganville, NJ (US);
Alan Glen Solheim, Stittsville (CA);
Robert Au-Yang, Bridgewater, NJ (US);
Mark Stephen Wight, Ottawa (CA);
Christian Scheerer, Ottawa (CA)

(73) Assignee: Alcatel Lucent, Paris (FR)

( * ) Notice: Subject to any disclaimer, the term of this patent is extended or adjusted under 35 U.S.C. 154(b) by 0 days.

(21) Appl. No.: 13/043,136

(22) Filed: Mar. 8, 2011

(65) Prior Publication Data

US 2011/0182576 A1 Jul. 28, 2011

Related U.S. Application Data

(62) Division of application No. 10/159,676, filed on May 31, 2002, now Pat. No. 7,941,047.

(60) Provisional application No. 60/306,302, filed on Jul. 18, 2001.

(51) Int. Cl.
*H04B 10/04* (2006.01)
(52) U.S. Cl. .............................. 398/15; 398/25; 398/37
(58) Field of Classification Search .................. 398/13, 398/15, 25, 30–33, 37
See application file for complete search history.

(56) References Cited

U.S. PATENT DOCUMENTS

| | | | |
|---|---|---|---|
| 6,075,630 A | | 6/2000 | Nishio |
| 6,115,157 A * | | 9/2000 | Barnard et al. .................. 398/1 |
| 6,219,162 B1 | | 4/2001 | Barnard et al. |
| 6,961,524 B1 * | | 11/2005 | Foo ................................ 398/197 |
| 2002/0114608 A1 * | | 8/2002 | Maroney et al. ............... 385/147 |
| 2002/0163683 A1 * | | 11/2002 | Antoniades et al. .......... 359/110 |
| 2003/0016410 A1 | | 1/2003 | Zhou et al. |
| 2003/0053163 A1 * | | 3/2003 | Li et al. ......................... 359/110 |

FOREIGN PATENT DOCUMENTS

| | | |
|---|---|---|
| EP | 1 265 451 | 12/2002 |
| WO | WO 01/15368 | 3/2001 |
| WO | WO 01/19006 | 3/2001 |

OTHER PUBLICATIONS

Ramamurthy B et al.: "Impact of Transmission Impairments on the Teletraffic Performance of Wavelength-Routed Optical Networks" Journal of Lightwave Technology, IEEE Service Center, New York, NY, US, vol. 17, No. 10, Oct. 1999, pp. 1713-1723, XP001033232 ISSN: 0733-8724.

* cited by examiner

*Primary Examiner* — Dzung Tran
(74) *Attorney, Agent, or Firm* — Capitol Patent & Trademark Law Firm, PLLC

(57) ABSTRACT

A method for engineering of a connection in a WDM photonic network with a plurality of flexibility sites connected by links comprises calculating a physical end-to-end route between a source node and a destination node and setting-up a communication path along this end-to-end route. An operational parameter of the communication path is continuously tested and compared with a test threshold. The path is declared established whenever the operational parameter is above the margin tolerance. The established path is continuously monitored by comparing the operational parameter with a maintenance threshold. A regenerator is switched into the path whenever the operational parameter is under the respective threshold, or another path is assigned to the respective connection. An adaptive channel power turn-on procedure provides for increasing gradually the power level of the transmitters in the path while measuring an error quantifier at the destination receiver until a preset error quantifier value is reached. As the connection ages, the power is increased so as to maintain the error quantifier at, or under the preset value. The path operation is controlled using a plurality of optical power/gain control loops, each for monitoring and controlling a group of optical devices, according to a set of loop rules.

9 Claims, 6 Drawing Sheets

METHOD FOR ENGINEERING CONNECTIONS IN A DYNAMICALLY RECONFIGURABLE PHOTONIC SWITCHED NETWORK

RELATED PATENT APPLICATIONS

This application is a divisional of application Ser. No. 10/159,676 entitled "Method for Engineering Connections In A Dynamically Reconfigurable Photonic Switched Network" filed on May 31, 2002 now U.S. Pat. No. 7,941,047, which claims the benefit of priority to U.S. Provisional Patent Application Ser. No. 60/306,302 filed on Jul. 18, 2001, the disclosures of which are hereby incorporated by reference herein in their entireties as if they had been set forth in full herein.

FIELD OF THE INVENTION

The invention is directed to a telecommunication network, and in particular to a method for engineering connections in a dynamically reconfigurable photonic network.

BACKGROUND OF THE INVENTION

Current transport networks are based on a WDM (wavelength division multiplexing) physical layer, using point-to-point (pt-pt) connectivity. A WDM optical signal comprises a plurality of transmission channels, each channel carrying an information (data) signal modulated over a carrier wavelength.

The span reach, or the distance between a transmitter and the next receiver, is limited by the combined effect of attenuation and distortion experienced by the signal along the optical fiber. A solution to increase the span reach is to place optical amplifiers between the nodes. While the amplifiers significantly increase the optical power of all optical channels passing through them, they exhibit a wavelength-dependent gain profile, noise profile, and saturation characteristics. Hence, each optical channel experiences a different gain along a transmission path. The optical amplifiers also add noise to the signal, typically in the form of amplified spontaneous emission (ASE), so that the optical signal-to-noise ratio (OSNR) decreases at each amplifier site. Furthermore, the optical signals in the co-propagating channels have different initial waveform distortions and undergo different additional distortions during propagation along the transmission medium (optical fiber). As a result, the signals have different power levels, OSNRs, and degrees of distortion when they arrive at the respective receivers, if they had equal power levels at the corresponding transmitters.

As the flexibility of today's networks is delivered electronically, termination of photonic layer is necessary at each intermediate node along a route, and therefore optimization can be performed by equalizing the system span by span. There are numerous performance optimization methods applicable to traditional networks, all based on 'equalizing' a certain transmission parameter of the WDM signal. It has been shown that the SNR (signal-to-noise ratio) at the output of an amplified WDM system can be equalized by adjusting the input optical power for all channels. For example, U.S. Pat. No. 5,225,922 (Chraplyvy et al.), issued on Jul. 6, 1993 to AT&T Bell Laboratories, provides for measuring the output SNRs and then iteratively adjusting the input powers to achieve equal SNRs. A telemetry path between the nodes provides the measurements obtained at one node to the other.

Performance of an optical system is also defined by the BER (bit error rate) and Q factor. BER is the ratio between the number of the erroneously received bits to the total number of bits received over a period of time. U.S. Pat. No. 6,115,157 (Barnard et al.) issued to Nortel Networks Corporation on Sep. 5, 2000 discloses a method of equalizing the channels of a WDM path based on an error threshold level for each channel in the WDM signal, set in accordance with the channel rate. The transmitter power is adjusted taking into account the attenuations determined for all channels, which attenuations are calculated according to the measured BER.

As indicated above, these traditional span engineering methods are applicable to point-to-point network architectures, where all channels of a WDM signal co-propagate along the same physical medium (fiber strand) and between same source and destination nodes.

The present invention is applicable to a photonic network where each signal travels between a different source and destination node without unnecessary OEO conversions at all intermediate nodes. Thus, the conventional pt-pt based DWDM transport boundaries disappear in this architecture and are replaced by individual wavelength channels going on-ramp and off-ramp at arbitrary network nodes. Details about the architecture and operation of this photonic network are provided in co-pending patent application "Architecture for a Photonic Transport Network" (Roorda et al.), U.S. patent application Ser. No. 09/876,391 filed on Jun. 8, 2001 and "Architecture for an Optical Network Manager" (Emery et al), U.S. Provisional Patent Application 60/298,008 filed on Jun. 13, 2001, both assigned to the applicants. These patent applications are incorporated herein by reference.

By removing OEO conversion for the passthru channels at the switching nodes, connection set-up and control become significant physical design challenges. Traditional channel performance optimization methods do not apply to end-to-end connections that pass through many nodes without OEO conversion. Furthermore, traditional section-by-section equalization cannot be performed; connections sharing a given fiber section now have substantially different noise and distortion impairments, determined by their network traversing history.

There is a need to provide a method for engineering connections in photonic switched networks, where the channels do not have the same source and destination node.

Traditional point-to-point WDM networks perform span and path engineering based on the worst-case rules, in that the channels are aligned to the performance of the weakest channel. This clearly is not the most advantageous way of using the network resources.

There is a need to provide a method for engineering connections, which makes a better use of the available network resources than the current equalization methods.

Furthermore, traditional networks are static, in that channel allocation is fixed and any addition or removal of a channel implies extensive engineering of all channels along the affected section(s). On the other hand, the photonic switched network to which this invention applies is provided with a routing and switching mechanism that allows automatic set-up and tear-down of connections or on request. Clearly, the traditional span and path equalization methods cannot be applied in the context of dynamical reconfiguration of connections as in the above-referred photonic switched network.

There is a need to provide a method of engineering connections by switching a connection from a current path to another or changing the configuration of the current path automatically, once the network detects that the performance parameters of the current path are below preset thresholds.

SUMMARY OF THE INVENTION

It is an object of the invention to provide a method for engineering connections in a dynamically reconfigurable photonic switched network.

The present invention is aimed at optimizing performance and cost of a D/WDM photonic network and ensuring a connection performance level over the lifetime of a given network connection, in the presence of network reconfiguration and other churn in the physical layer.

According to one aspect of the invention, there is provided a method for engineering of a connection in a WDM photonic network with a plurality of flexibility sites connected by links, comprising: (a) calculating a physical end-to-end route between a source node and a destination node; (b) setting-up a data communication path along the end-to-end route; (c) testing an operational parameter of the data communication path; and (d) comparing the operational parameter with a margin tolerance and declaring the data communication path as established, whenever the operational parameter is above the margin tolerance.

Another aspect of the invention concerns a data communication path for connecting a source node with a destination node along one or more intermediate nodes of a photonic network, the data communication path operating in one of a monitoring mode and a maintenance mode, according to a path operational parameter.

Still another aspect of the invention provides a photonic network for routing a data communication path between a source node and a destination node along a route passing through an intermediate node, comprising: a pool of wavelength-converter/regenerators connected at the intermediate node; a line control system for collecting performance information on the data communication path; and a network management system for assigning a wavelength-converter/regenerator from the pool to the data communication path and switching the data communication path through the wavelength-converter/regenerator, whenever the performance of the data communication path is outside an operation range.

A method of engineering a connection between two terminals of a dynamically reconfigurable photonic network comprises, according to still another aspect of the invention: setting-up a path whenever an operational parameter of the path is above a test threshold; operating the path in monitoring mode whenever the operational parameter is above a maintenance threshold; and servicing the path whenever the operational parameter is under the maintenance threshold.

The invention is also directed to a method of engineering a connection over a WDM photonic network with a plurality of flexibility sites, comprising: selecting a data communication path for the connection based on network topology information, resources specifications and class of service constrains; turning on a source transmitter, a destination receiver and all transmitters and receivers at all flexibility sites along the path; increasing gradually the power level of the transmitters while measuring an error quantifier at the destination receiver; and maintaining the power at the transmitters at a first level corresponding to a preset error quantifier.

According to a still further aspect, the invention provides for a control system for engineering connections in a photonic switched network, with a plurality of wavelength cross-connects WXC connected by links comprising: a plurality of control loops, each for monitoring and controlling a group of optical devices, according to a set of loop rules; a plurality of optical link controllers, each for monitoring and controlling operation of the control loops provided along a link; a plurality of optical vertex controllers, each for monitoring and controlling operation of the control loops provided at a wavelength cross-connect; and a network connection controller for constructing a data communication path within the photonic switched network and for monitoring and controlling operation of the optical link controller and the optical vertex controller.

By moving away from the traditional worst case based engineering rules the overall network design and cost can be significantly optimized. Advantageously, the invention provides end-to-end path performance optimization based on current network connectivity information and current physical performance parameters of the path, which leads to significant up-front and lifecycle network cost savings.

Use of current network connectivity information and current physical performance parameters of the path also confers better accuracy of network operations control.

Furthermore, the path engineering method according to the invention provides for flexibility of control. Thus, in one embodiment, a path switch or a path configuration change is prompted based on real-time network performance parameters, on cost and churn tolerance and network loading. In another embodiment, a path switch or a path configuration change is triggered whenever a path operates outside a flexibly allocated Q range. This reduces the complexity of traditional engineering methods, resulting in a network that can be exploited based on class of service specific constrains.

Still further, the engineering method according to the invention provided for an adaptive power turn-on procedure that allows significant savings, as the path power is set according to the current performance, rather than according to the possible end-to-end performance as in traditional procedures. The power setting can be moved up as the network ages, the local conditions change, etc.

BRIEF DESCRIPTION OF THE DRAWINGS

The foregoing and other objects, features and advantages of the invention will be apparent from the following more particular description of the preferred embodiments, as illustrated in the appended drawings, where.

DESCRIPTION OF PREFERRED EMBODIMENTS

The term 'connection' refers here to an end-to-end logical path, which can be set-up along a plurality of physical paths, using regenerators at intermediate nodes as/if needed, and employing one or more wavelengths.

The term 'flexibility site' or 'flexibility point' refers to a node of a D/WDM network where connections could be added, dropped and/or switched from an input fiber to an output fiber. Such nodes are provided in the network according to the above-identified patent applications with a wavelength cross-connect or with an optical add/drop multiplexer.

The term 'path' refers here to a source-destination physical route (also referred to as an 'A-Z path' or A-Z connection). A path can have one or more configurations, due to the flexible regenerator placement and wavelength assignment capabilities. The term 'link' is used for the portion of the network between two flexibility sites, and the term 'section' refers to the portion of the network between two optical amplifiers. The term 'channel' is used to define a carrier signal of a certain wavelength modulated with an information signal.

The term 'reconfiguration' in the context of a photonic network as described below refers to the ability of the network to add, remove, reconfigure and re-route connections automatically or as requested by a user.

Network reconfiguration adds new challenges to the physical design, as the physical layer performance optimization of the network becomes a function of the past, present as well as future network configurations. In other words, dynamic network reconfiguration introduces a physical path connection hysteresis; in point-to-point optical DWDM paths, OEO conversion isolates the optical transmission sections.

A critical design challenge for the reconfigurable networks is to minimize the effect of the traffic pattern changes on the connections sharing the affected sections. Another design challenge is to optimize the network for the maximum reach and minimum cost (i.e. minimum total number of regenerators) during the steady state operation. The present invention is concerned with providing a reconfigurable photonic switched network with a method of path engineering, suitable for responding to the above challenges.

In other words, the invention enables providing a path for a connection, setting-up a path, and removing a path by ensuring that the path set-up and removal have minimum impact on other connections sharing the same fiber. Also, the invention enables maintaining the path operational parameters throughout its life, in the presence of factors such as aging of components, temperature variation, etc. and disturbances caused by set-up and removal (churn) of other connections.

Figure 1A:
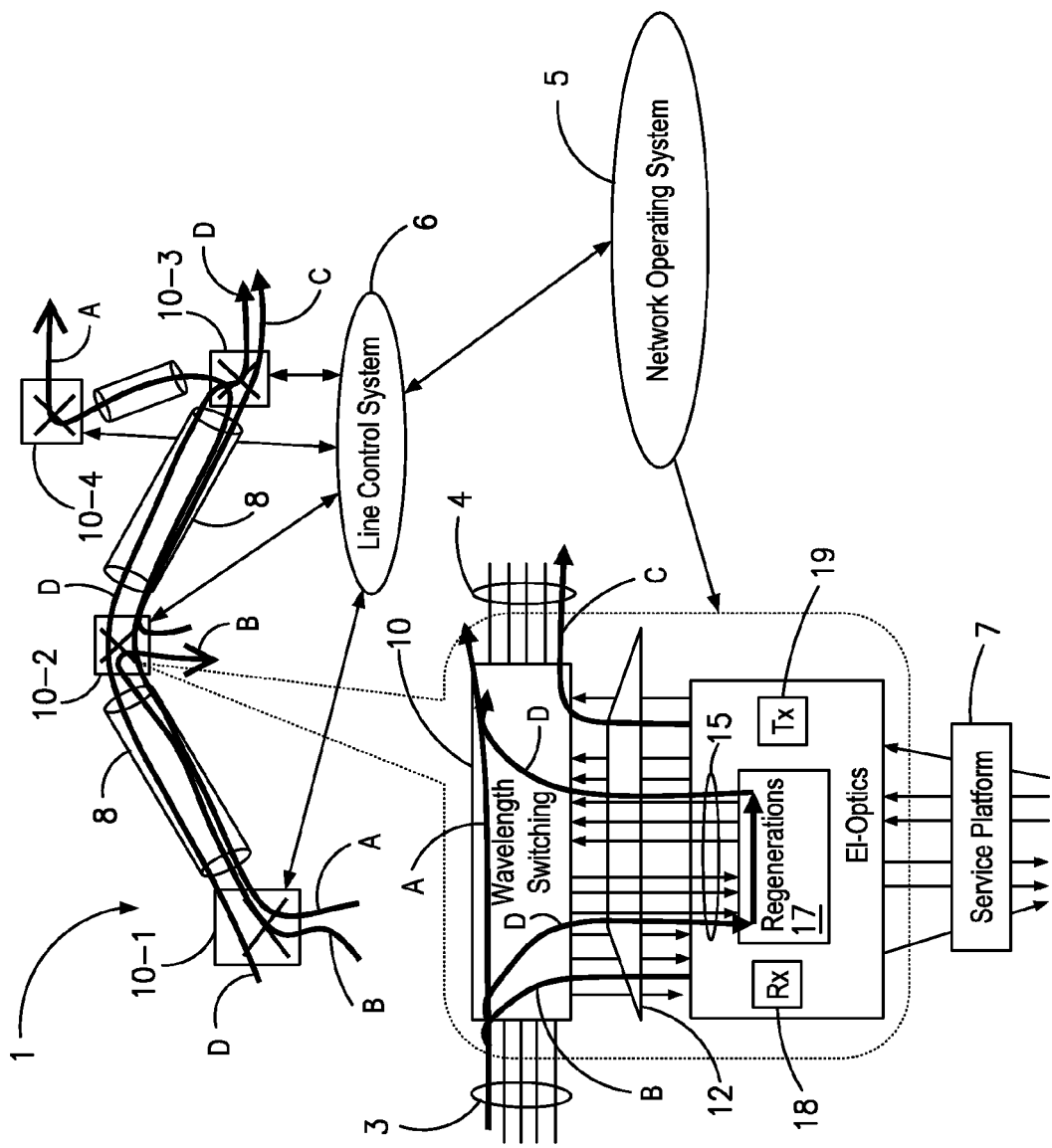
FIG. 1A shows the general architecture for a photonic network to which the path engineering method according to the invention applies.

FIG. 1 illustrates a portion of a network 1 to which the present invention is applicable, showing one fiber chaining from a node 10-1 to a node 10-4. The nodes 10-1 to 10-4 are called flexibility points, since they are provided with the ability to switch a channel from an input fiber to an output fiber of choice, and to add/drop traffic. It is to be noted that the invention also applies to networks with multiple port nodes, as shown in the insert for node 10-2, and that the traffic on any path may be bidirectional. It is also to be noted that a flexibility point may be a wavelength switch as in FIG. 1A, or may be an optical add/drop multiplexer (not shown), which performs optical add, drop and passthru (without switching channels from one fiber to another).

An optical line system 8, shown between any two consecutive nodes includes line amplifiers, pre-amplifiers, post-amplifiers and associated dispersion and power management equipment necessary for ultra-long reach propagation.

The routes of four optical signals A, B, C and D are shown as an example of how the network operates. Signal A travels between nodes 10-1 and 10-4, signal B travels between nodes 10-1 and 10-2, and signal D, between nodes 10-1 and 10-3. A signal C is launched over the network at node 10-2 and exits at node 10-3. In this example signals A, B and D are combined (multiplexed) at node A into a multi-channel, or wavelength division multiplexed (WDM) optical signal and transmitted over the same optical fiber towards node 10-2. Other channels may also be multiplexed on this line. At node 10-2, signals A, B and D are optically demultiplexed from the WDM signal. As node 10-2 is the destination for signal B, signal B must be 'dropped' to the local user, illustrated generically by service platform 7, while signals A and D pass through node 10-2 and continue their travel towards node 10-3.

A flexibility site such as node 10-2 comprises an access demultiplexing and switching stage 12 for routing each dropped channel, such as channel B, to a respective receiver 18, and from there to the service platform 7. The access stage 12 also provides for switching add channels, such as channel C, from the service platform 7 to a selected output port of node 10-2. The switch stage 10 and access stage 12 have a broadcast and select structure that uses splitters/combiners and tunable optical components such as blockers, filters. These stages are also provided with low power optical amplifiers (amplets) to compensate for the path losses across the respective stages. The access structure is also provided with variable optical attenuators for each add port, to allow a slow turn-on of the optical components, as it will be seen later.

It is to be emphasized that the invention is not restricted to this specific type of node; the example of FIG. 1 was introduced for clarifying some terms that will be later used in the description. In more general terms, the invention applies to a dynamically reconfigurable WDM network 1, where 'not all wavelengths are equal', i.e. the channels have a different network traversing history, they may not have same path length or same origin and destination.

While channel A passes through node 10-2 in optical format, there are cases when a passthru channel, such as channel D in the example of FIG. 1, needs to be OEO processed at node 10-2. Namely, in some cases signal D needs to be moved on another wavelength (if e.g. the wavelength of the channel carrying signal D is already used by another signal on the same fiber between nodes 10-2 and 10-3). Wavelength conversion is performed in electrical format, as it involves demodulation and modulation operations. As well, electrical conversion is needed if signal D requires regeneration for conditioning (re-timing, re-shaping). To this end, the switching nodes of network 1 comprise a pool of tunable regenerators 17 which can be attached to some of the spare drop/add ports 15, and which are ready for carrying passthru channels if/whenever needed. The optical regenerators 17, as well as the receiver terminal, have the capability to provide BER or Q information on the received traffic, either through a built-in test pattern detection mechanism, or via error counting capabilities of the Forward Error Correction (FEC) scheme, using a Q extrapolation approach.

It is evident that the distance traveled in the network 1 by channels A, B, C and D is different. Therefore, only power equalization can be effected on the common path 10-1 to 10-2; OSNR equalization will unnecessarily degrade channel B, or any channel shorter than A.

Figure 1B:
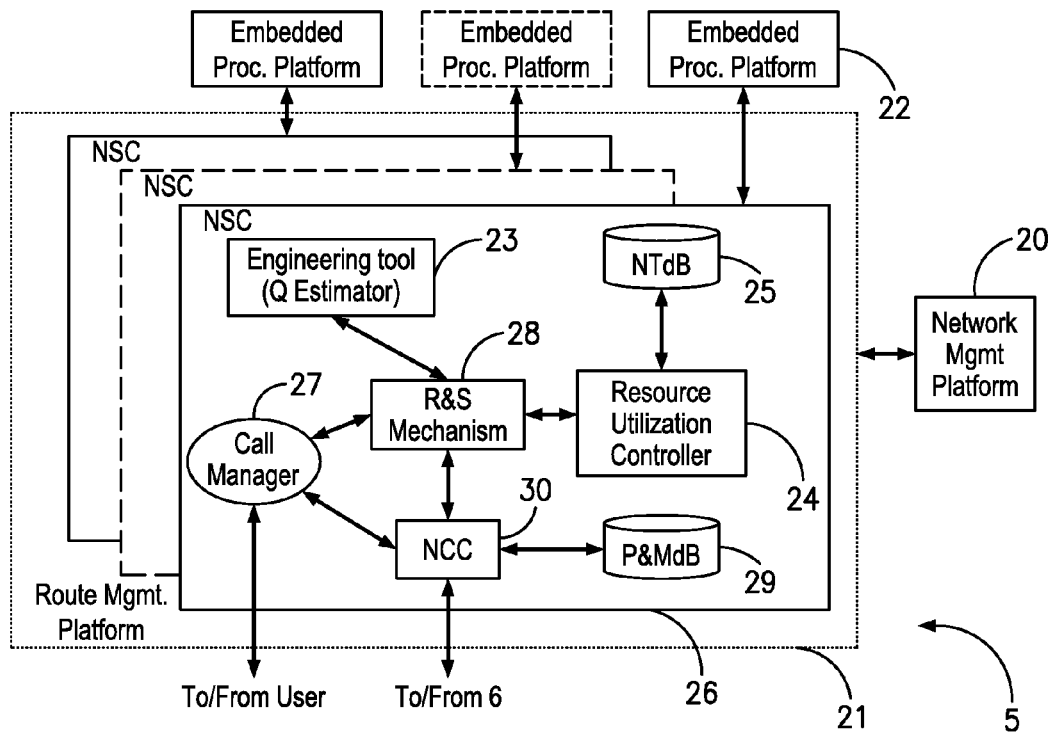
FIG. 1B shows a block diagram of the network operating system of network shown in FIG. 1A.
Figure 4:
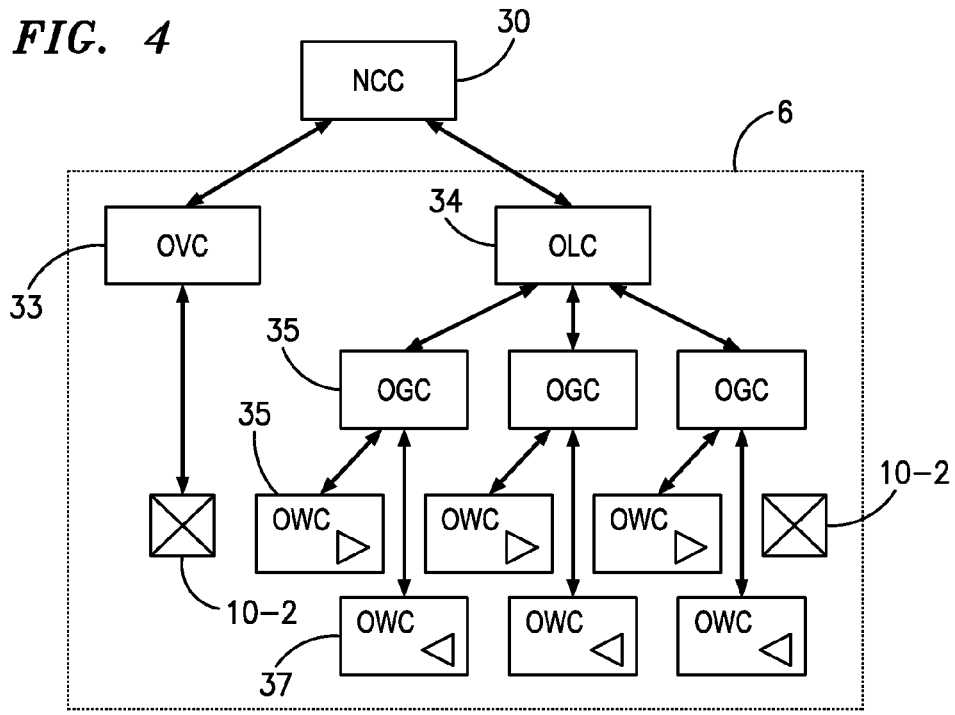
FIG. 4 is a block diagram of the line control system of network of FIG. 1A.

Network 1 is also provided with an intelligent network operating system NOS 5 which is shown in some detail in FIG. 1B. NOS 5 enables photonic constrained wavelength routing, network auto-discovery and self-test, capacity and equipment forecasting and network optimization capabilities. A line control system 6, shown in some detail in FIG. 4, provides network 1 with embedded photonic layer monitoring, which confers adaptive power and dispersion control. System 6 feeds real time line performance information to NOS 5.

As shown in FIG. 1B, the network operating system NOS 5 includes a number of computation platforms, such as a network management platform 20, a route management platform 21, and an embedded processing platform 22. In general, the network management platform 20 performs network level functions, route management platform 21 performs node-related functions and node connection control, and the embedded platform 22 performs circuit pack and component control. For example, the management platform 20 supervises the operation of the network and the network elements, performs channel provisioning in conjunction with a planning platform (not shown), provides performance information collection for link operation monitoring, and also provides system and security control.

Route management platform 21 is responsible with signaling and routing, network connection control and optical link control. Platform 21 comprises a network service controller NSC 26 at each flexibility site, which controls the flexibility site on which it resides and potentially a number of optical line amplifier and OADM nodes associated with optical links emanating from the site. NSC 26 is equipped with a routing and switching R&S mechanism 28, responsible with finding a plurality of A-Z paths for a given connection request and ordering the paths according to their estimated performance. The paths are constructed based on class of service constrains, regenerator placement rules and wavelength assignment rules. To order the paths, the R&S mechanism 28 uses an engineering tool 23, which provides the estimated Q for each link in the path, and assigns to the path the minimum Q for all links.

The engineering tool 23 uses data such as fiber loss, length and dispersion measurements, wavelength power measurements, loop models and loop states, and provides input signal ranges and output signal targets to the optical power control loops. The engineering tool also delivers the Q margin criteria or/and the Q thresholds.

Platform 21 constructs a network topology database, shown generically at 25, by querying the embedded platform 22, which reports cards and shelves identity, position and configuration. A resource utilization controller 24 provides the R&S mechanism 28 with the information about availability, type and placement of regenerators and wavelengths, taking also into account forecast on demands.

A network connection (or channel) controller NCC 30 is responsible for the end-to-end light-path set-up across the optical network. NCC 30 collects performance data from the line control system, as shown generically by performance and monitoring P&M database 29, and connectivity data from R&Ss 28. Database 29 may also maintain user-defined thresholds for these parameters. Based on this real time performance information and on thresholds preset for the monitored parameters, the management platform 20 decides if a channel needs regeneration or wavelength conversion, or decides on an alternative route for traffic optimization.

A call manager 27 communicates the path request and the corresponding constrains to the R&S mechanism and performs call accounting, administration and availability. In network 1, a service (e.g. an A-Z path) can be set-up by a user by a simple point and click on a user terminal (not shown).

In network 1, the dynamics of network connectivity leads to dynamics in physical transmission performance. A path may operate in four main operation modes: set-up mode, monitoring mode, service mode, and tear-down mode. Control and monitoring of these operation modes is in the responsibility of the management platform 20, based on a performance information collected in database 29 and topology information collected in database 35.

The basic rules for the dynamic reconfiguration of the network provide that any path set-up and tear-down operation should take place with minimum disturbances to the existing channels on all sections of the path. On the other hand, once the new path is set up and in operation, all sections of the path should be very tolerant of subsequent reconfiguration events.

Path Set-Up Mode.

The term 'set-up' in the context of a connection over network 1, refers to the procedures from a request to exchange traffic between a source and destination terminal, until establishment of a path connecting these terminals. Path set-up takes place in a number of stages.

Path Selecting Stage

First, the R&S mechanism 28 receives a path set-up request either from the network management platform 20, or from terminal 28. Call manager 27 processes the request by giving an ID to the connection, and transmits to the R&S mechanism 28 and the NCC 30 connection ID and the constrains associated with the request (e.g. pass through node 10-3). The call manager obtains a list of best paths calculated by the R&S mechanism 28, using engineering tool 23. The paths in the lists are ordered according to preset criteria, such as for example the cost, or set-up success probability, determined using engineering tool 23.

Path Reservation Stage

Next, once the best paths are identified for a given request, the Call manager 27 passes the paths (starting with the best one) to the internal signaling layer of R&S mechanism 28 on the associated NSC 26, for reserving the resources along the path. The internal signaling layer also passes the connection data to all NSCs of the nodes involved in the connection (passthru and destination) for reservation of the resources of the entire path. Once the resources along the entire path are reserved, the signaling layer passes this information to the NCC 30 of NOS 5.

Path Turn-on Stage

The NOS 5 instructs all nodes in the light-path, which are in the example of path A nodes 10-1, 10-2, 10-3, and 10-4 to connect as needed. That is, it instructs node 10-2 and 10-3 to proceed with passthru and instructs node 10-4 to proceed with access drop. (In the case of the other connections on FIG. 1A, NOS 5 instructs the node 10-2 to proceed with access drop for connections B and D, or to proceed with access add for connection C).

The transmitters and receivers allocated to the respective A-Z path are now powered-up, the transmitters are tuned on the wavelength allocated to the respective link, and begin transmitting the respective channel wavelengths.

To account for, and monitor both fast unplanned transience (such as EDFA transience and some polarization induced impairments, which rapidly settles down after an initial performance degradation) and performance variations due to slow drift/ageing and planned network churn events, a number of Q/BER integration time constants are preferably incorporated in the line control system.

It is known that the performance of a channel increases with the signal power, because the OSNR increases with the optical signal power. However, as the optical power is further increased, the impact of non-linear effects (four wave mixing, cross phase modulation, self phase modulation, etc.) on the signal quality increases, and at some point the performance starts to degrade at higher optical powers.

An adaptive channel power turn-on procedure is used for setting-up a new path in network 1. Rather than simply turning on the optical power to the maximum power as in the traditional systems, according to the invention optical power is slowly introduced along the paths to ensure that optical amplifiers and amplets, which are shared with other channels, behave predictably, and also to allow tuning of optical components along the connection.

At the beginning, while there is optical power at the output of the transmitters, this power is attenuated so that there is no light arriving at any receiver. The slow turn-on procedure not only prevents fast transience in the network, but also allows data collection for all established connections sharing common sections with the new path.

The BER of the signal is monitored as the optical power is increased, until an acceptable BER for the entire path is achieved at the receiver. This procedure is described in further details under the title "Adaptive channel power turn-on procedure"

Path Testing Stage

Once the light-path is fully connected from end-to-end, across the network, the NCC requests a quality measurement from all termination points in the path (receivers of the regenerators, wavelength converters and the destination receiver). Now, the line control system 6 extracts performance data from all links and compares this data with a start of life "margin tolerance", or "test threshold". If there is sufficient margin hedge against potential network performance degradation in the life of the path connectivity, or if the path Q is above the test threshold, the path set-up is considered successful and the path is marked as 'existing'.

If the light-path does not meet its margin or threshold target, the NOS 5 turns-off the path and tries a wavelength upgrade for the respective connection. A wavelength upgrade is particularly applicable to paths including none or one regenerator, and implies finding a new wavelength(s) that has higher chances to succeed for the respective link loading, length and fiber type.

If the light path still does not meet its margin or threshold target, NOS 5 tries the next level of regeneration in the list of best paths. Thus, a regenerator is switched in the path at one of the intermediate nodes (in the example of FIG. 1A at one of intermediate nodes 10-2 or 10-3). To this end, the NOS inquiries the resource utilization controller 24 to discover a free regenerator 17 that can be allocated to the path. Once a free regenerator is switched in the path, the test is repeated, until a path from the list can be marked 'established'. If all the paths in the list fail, the NOS 5 fails the light-path setup.

Path Monitoring Mode

The term 'monitoring' refers to the normal operation of a path for transporting traffic between the transmitter and receiver terminals. During this stage, the network starts monitoring the path performance, particularly during the establishment and abolishment of other paths, which share common sections with this existing path. The path is maintained as long as its performance is better than a "churn threshold" or a "maintenance threshold".

For collecting monitoring data, signals are sampled and processed in the digital domain. A signal must be sampled at a rate greater than or equal to twice its maximum frequency component. A number of different techniques can be used for cases where the sampling rate is not fast enough. These techniques can only be used for a class of signals that may have a high frequency component with a low periodicity. Averaging of samples of signals in this class prevents exaggerated loop responses. Another useful filter takes multiple samples and discards the data if there is a significant change over the sample interval. A third method uses the knowledge of the event origination to suppress and sequence the system response.

Ideally, the network operating system ensures that a path always stays just slightly above or on the threshold during the life time of the path—the best compromise between network cost and performance expectations is maintained in this case.

Path Maintenance (Service) Mode

The path may enter into a service mode under certain circumstances. Relevant to this specification, is the case when the path performance reaches or falls below the "churn threshold" or the "maintenance threshold" during the life of the connection. In this case, the path enters into a "churn management" stage or a "maintenance" mode. In this stage, either a new end-end route is calculated by the R7S mechanism 28, and established, or a regenerator is deployed as during path set-up stage described earlier.

Path Tear-Down Mode

The term 'tear-down' refers to removing a connection. This implies attenuating the power at the transmitters and blockers, inhibiting the traffic restoration procedures, removing the deleted wavelength(s) from the steady state control, and turning-off the transmitters and the receivers along the A-Z connection.

The same approach to processing a connection is used during the deployment of a new network, as well as in network reconfiguration, which involves old traffic tear-down and new traffic set-up in a partially filled network.

Figure 2B:
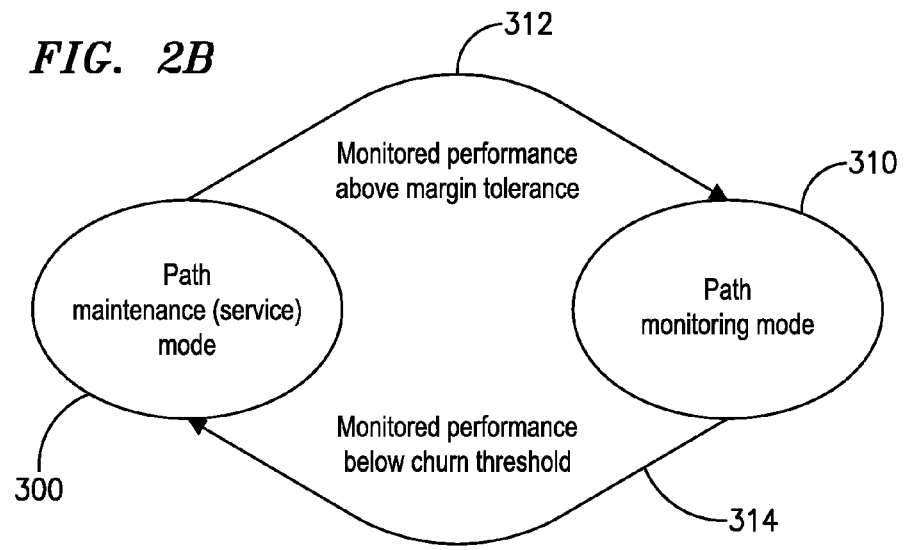
FIG. 2B shows a state machine for individual end-end path states based on TMMCM procedure.
Figure 2A:
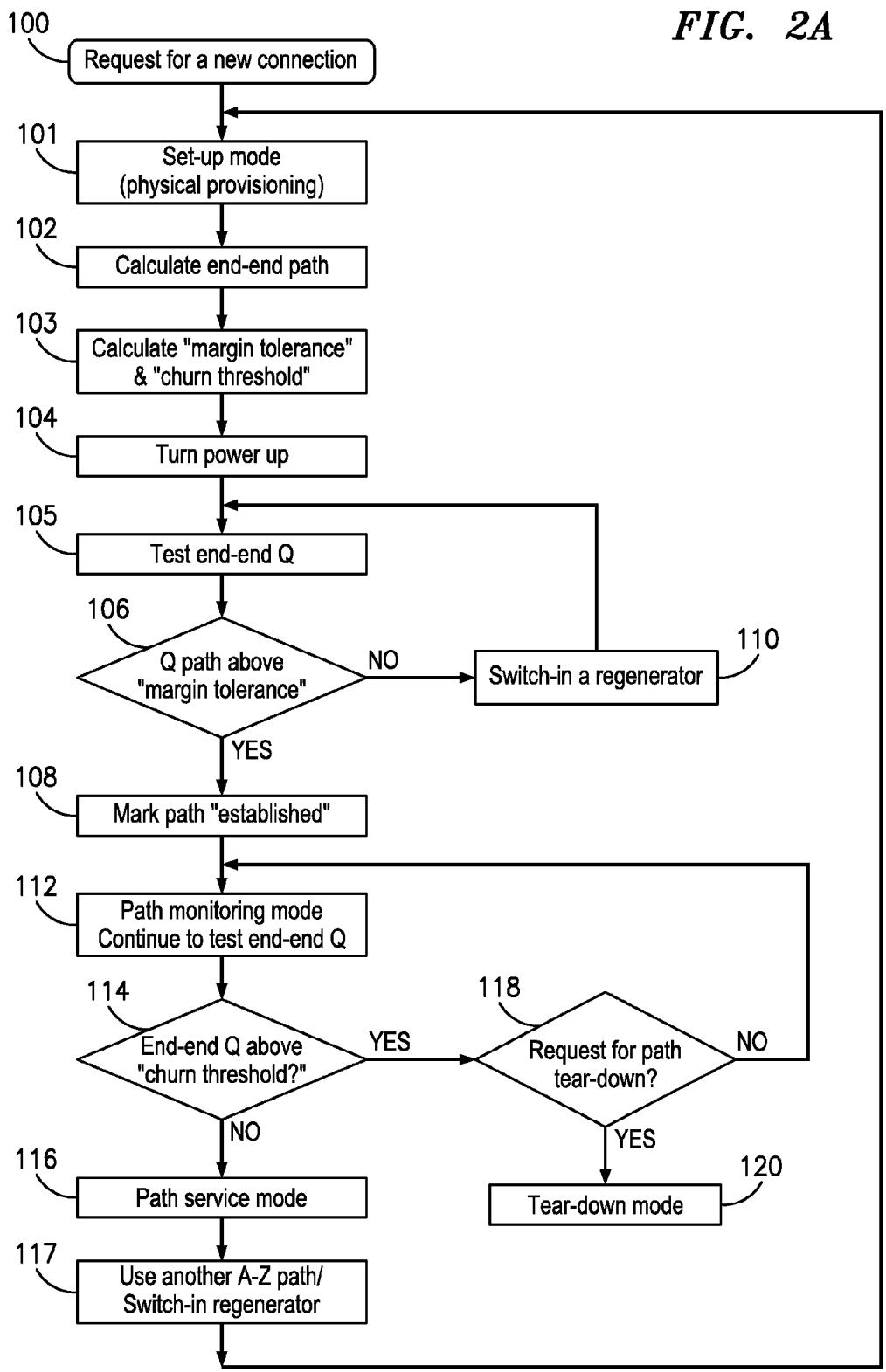
FIG. 2A shows a flow chart of the testing, margin hedging, monitoring and churn management TMMCM procedure according to an embodiment of the invention.

A flow chart describing an embodiment of a linear Testing, Margin hedging, Monitoring and Churn Management (TM-MCM) procedure according to an embodiment of the invention is shown in FIG. 2A. At step 100, a request for a new connection is received and the network operating system set-up mode starts, as shown at step 101. First, the network calculates a number of end-to-end paths for servicing the request and selects the best path, as shown in step 102. In the example of FIG. 1A, management platform 20 determines that a physical route between nodes 10-1 and 10-4, which satisfies the connectivity request is a route passing through nodes 10-2 and 10-3. A wavelengths is allocated to this connection; however, if the path has one or more regenerators, there could be more wavelengths allocated to this path.

Next, the margin tolerance and the churn threshold are calculated in step 103, as it will be seen later under title "Margins and thresholds".

After the path is turned-on, step 104, the Q factor for the new path is measured at the receiver, as shown in step 105.

The measured Q factor is compared with the margin tolerance, step 106. If the connection performs above the margin tolerance, the path is acceptable for use and marked as such, i.e. is declared an "established" path (or "active", or "existing"), step 108. If the measured Q value is under the margin tolerance, the network operating system 5 looks for a wavelength upgrade or a regenerator 17 available at one of the intermediate nodes, and the channel is OEO converted at that intermediate site for processing. End-to-end connectivity is reestablished through a regenerator, as shown in step 110.

The 'existing' path is now monitored, by continuously measuring the Q factor, step 112. The performance of the path changes as new paths are set-up or removed from common links, such as links 10-1 to 10-2, 10-2 to 10-3 and 10-3 to 10-4 in the example of FIG. 1A. It is possible for path A to perform under the churn threshold in certain circumstances, branch NO of decision block 114. In such a case, the path enters in the path service mode, step 116, in which case the network operating system 5 looks for a regenerator 17 at an appropriate intermediate flexibility site, or switches the connection over a new paths that may have better chances of performing under the current network churn conditions, step 117.

In the case when a request to tear-down the path is received while the path operates above the maintenance threshold, step 118, the tear-down procedure is performed in step 120.

A main issue to address with all optically switched DWDM networks 1 is the inter-channel interference when new channels are set and/or torn down. This can also be managed as a part of the TMMCM procedure, which is best described as a state machine as shown in FIG. 2B.

FIG. 2B shows how the path state changes between the service mode state 300 and monitoring mode 310. If path performance is above the margin tolerance the path transits from service mode 300 to monitoring mode 310. If path performance is below a churn threshold, it transits from state 310 to state 300.

The TMMCM procedure can in addition be an effective tool to manage tolerances in path installation, component/sub-system manufacturing and ageing (when there are significant network reconfiguration activities over time) because the margins are adjusted every time a path is set up based on the real time performance of all network elements that constitute the physical path.

Figure 3:
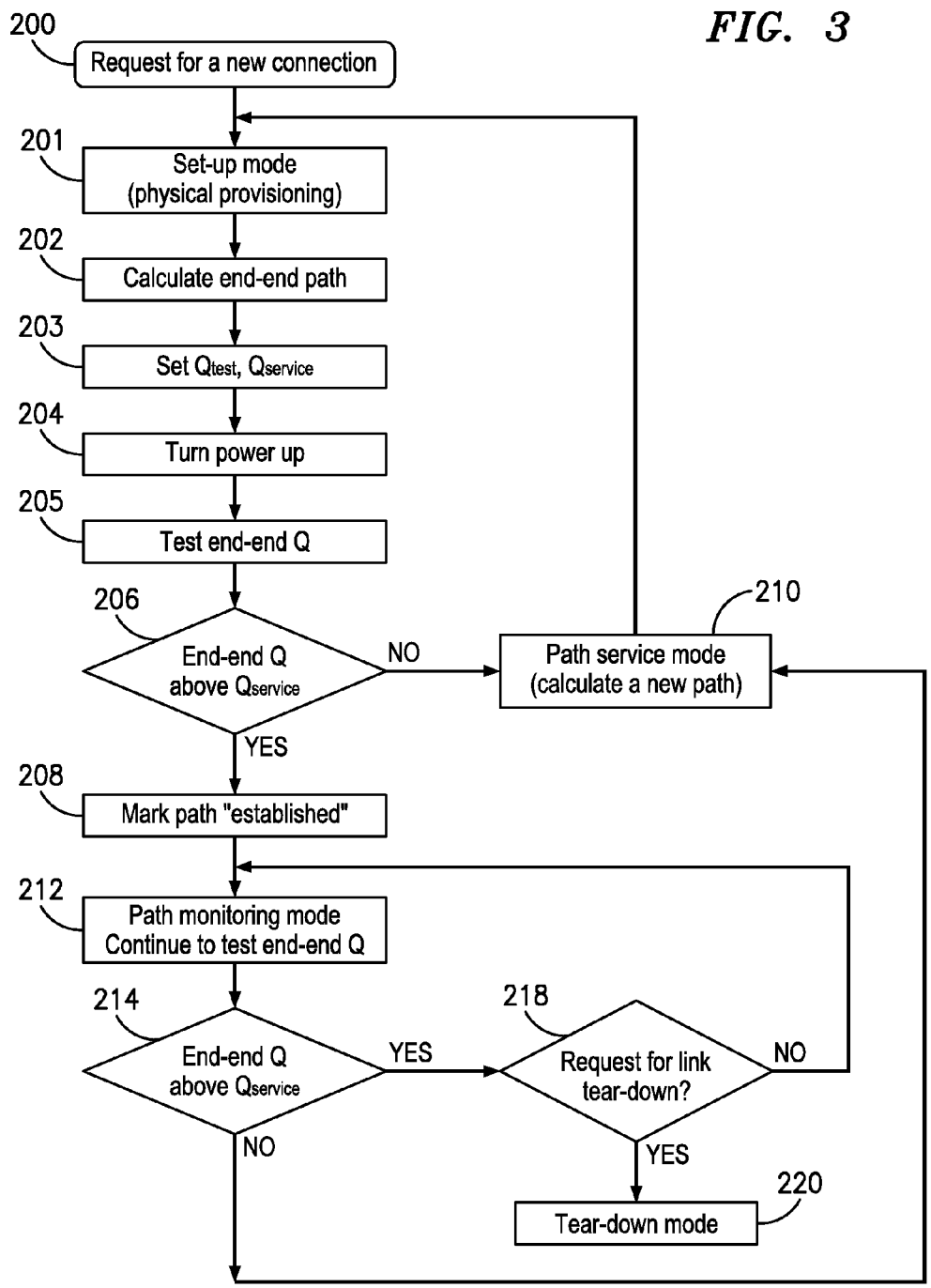
FIG. 3 is a flow chart a path engineering procedure according to another embodiment of the invention.

A flow chart describing another embodiment of a path engineering procedure is shown in FIG. 3. Steps 200, 201 and 202 are similar to the first three steps of the flow diagram of FIG. 2A. In step 203 two path thresholds $Q_{test}$ and $Q_{service}$ are selected based on actual (life) path measurement to allow added flexibility to the process, as it will be seen later under title "Margins and thresholds".

After the path was turned-on, step 204, the Q factor for the new path is measured at the receiver, as shown in step 205. The measured Q factor is compared with the test threshold, step 206. If the measured Q factor is above $Q_{test}$, the route is marked as "established", step 208. If the measured Q value is under the $Q_{test}$, the network operating system 5 provides another path and the connection is switched form the old path to the new one. In this case, the operations disclosed for the path set-up mode are repeated, steps 201-206. The new path may use the same physical route, but upgraded wavelengths, or additional regenerators placed in the path, or may use another physical route between the source and destination nodes. End-to-end connectivity is reestablished through the new path, as shown in step 210.

Each path is tested and maintained using control loops that account for the actual hardware along the route. A measurement of Q (or the equivalent BER) is used to determine if the performance is adequate to allow the path to be set and maintained, shown in step 212.

If the path performance degrades under $Q_{service}$, branch NO of step 214, the path enters in service mode, step 210, in which case the network operating system 5 looks for a path upgrade (upgrading the wavelengths, or/and adding regenerators 17) or for a new path that may have chances to perform better.

In the case when a request to tear-down the path is received while the path operates in monitoring mode, step 218, the tear-down procedure is performed in step 220.

Adaptive Channel Power Turn-on Procedure

There are significant benefits to using the adaptive power turn-on procedure described above. This procedure allows connections established along shorter optical paths, or those with transmitter and receiver pairs from the high end of the performance distribution, to have lower launch powers than connections established along longer paths. As a result, the total optical power needed from the optical amplifiers is reduced, thus reducing their cost. A lower launched power also reduces the cross-talk added by wavelengths with short optical paths, thereby increasing the performance of the copropagating channels.

As indicated above, typically the channel power is set at a maximum, and this maximum is determined from simulation and measurement and is a provisioned system parameter. However, the traditional setting assumes that the transmitter power is launched directly into the outside plant fiber. Nonetheless, in actual deployment of a new connection, the power launched into the outside plant fiber is reduced by the amount of in-building fiber and connector loss, which is not accounted for. On the other hand, the adaptive channel power turn-on procedure described above determines the actual maximum useful channel power for the real system conditions, thereby overcoming the effect of the variable in-building loss on system performance.

Still another advantage of the adaptive channel power turn-on procedure is that, if the BER of a connection degrades for any reason (aging, temperature, polarization effects, cross-talk due to channel loading, etc), the optical power can be increased until an acceptable BER is achieved, or the maximum channel power is reached.

Still yet another advantage of this method is that it provides a means for the system to compensate for performance degradations by first increasing the channel power, and only thereafter, if the path performance is still unsatisfactory, the network proceeds with upgrading the wavelength set used for the respective path, or switching a regenerator in the path, or switching the connection along another path.

Margins and Thresholds

Traditional WDM systems require a fixed span performance margin, compatible with any combination of transmitter, receiver, optical amplifiers, filters and fiber. In reality, some paths operate with a much higher margin than others, resulting in an inefficient use of network resources. In addition, this fixed performance margin is selected to achieve the desired performance of the span over the entire lifetime of the product and over any span loading conditions. In this way, regardless of age or loading, the performance of the traditional network is limited to the worst case scenario, resulting in higher first cost and higher lifecycle cost.

On the other hand, the network according to the invention uses in one embodiment, as shown in FIG. 2A, two "margins", one for the testing stage during set-up mode, and one for the monitoring mode. Thus, the margin tolerance can be set so as to allow sufficient margin hedge against potential network performance degradation during the life of the path, and the churn threshold can be set based on network churn information.

Also, because of the hysteresis of the network physical connectivity, the performance of a path depends on the loading conditions in all sections of the path, which are also accounted for in the margins.

The "margin tolerance" and "churn threshold" and are allocated flexibly, conferring a means to minimize the cost of the system under any conditions. These margins can be individually calculated for each channel, taking also into account components ageing and temperature variations, as well as a variable margin to account for channel loading. Furthermore, the margins can be a negotiated value based on customers' tolerance to price and network churn.

The path margin tolerances are determined by averaging or integration of the measured parameter(s) over a period of time (time constant). This time constant is relatively long because a proportion of the margin tolerance is allocated in the system to cover some of the fast temporal variations of the transmission system. In this way, these fast transience or drifts do not trigger the network maintenance (service) mode, since they were already accounted for. This time constant can be also a customer negotiated value as this will also have an impact on the amount of churn the transmission paths will see over their operation life time.

While this approach gives high flexibility to controlling operation of a path, it can be rather complex when the number of the existing connections and of the new requests is high. In such cases, instead of using the margin approach, the above two Q thresholds can be used for wavelength path set-up and maintenance.

As indicated above in connection with FIG. 3, $Q_{test}$ is the Q value that must be achieved on path set-up to declare a path established, while $Q_{service}$ is the Q value that triggers a maintenance activity. $Q_{service}$ is selected so as to maintain a virtually error free output even when the path is in the service mode. When during the service mode the path Q degrades to $Q_{service}$, the network operating system 5 triggers an alert to the user and finds a new path between the terminal locations of the degraded path. This new path may follow a different route, have additional intermediate regeneration added, or have lower impairments than the degraded path; in other words has a Q greater than $Q_{test}$.

Both of these Q thresholds are provisionable and hence allow the end user to trade off performance margin (and hence initial cost) against network churn (switching existing wavelength paths to new wavelength paths). This method also allows the end user to base the performance margin on real-time data from the network, rather than on theoretical calculations, resulting in greater accuracy and less wasted performance. This provides in the end for further reducing the lifecycle network cost and greater flexibility in the operation of the network.

Optical Power Control Loops

Control on per channel power, rather than relative OSNR is required in an dynamically reconfigurable network, as each channel will have an arbitrary OSNR dependant on its distance from source.

Network reconfiguration is enabled by optical control loops that sample the signal at given intervals and compare the averaged samples with performance targets. The link/network control has a layered architecture. The loops are controlled using the entities shown in FIG. 4.

The control loops are provided for setting and maintaining the parameters of the network optical devices within the operational ranges, so that the network is unconditionally stable. It is a design requirement that steady state operation of the control loops optimize the network for maximum reach. Maximum reach could be for example summarized as the minimum total number of network regenerators.

Optical widget controllers OWC 37 provide the interfaces to the various optical modules that make-up the network 1. They set the control targets for the optical modules, read run-time data and intercept asynchronous events. The OWC has a generalized interface to the optical module, and the vendor specific details are contained within the device drivers. OWCs are provided for example for the EDFAs (Erbium doped fiber amplifiers), Raman amplifiers, DGEs (dynamic gain equalizers), OSAs (optical spectrum analyzers), tunable filters (TF), VOA (variable optical attenuators), transmitters (Tx), receivers (Rx) and wavelength blockers (B), and are provided for both direction of transmission.

The optical group controllers OGC 35 coordinate the actions of various optical modules in an amplifier group, and implement a span control loop, to achieve a control objective for the group as a whole. An amplifier group is defined as the EDFAs, the Raman amplifiers, the DGEs monitored by an optical spectrum analyzer OSAs, in the same line system. More precisely, the network 1 is provided with a plurality of OSAs which enable visibility of signal power levels and noise levels. Each OSA module is shared by a number of optical components to provide control loops for e.g. transmitter power, blocker control, amplifier control. Fault monitoring also rely on this information to localize failures in the network.

The optical link controller OLC 34 is responsible with all control activities that fall within the scope of a single line system. As indicated above, the link (line) is the fiber and associated amplifier group(s) between two flexibility points. The OLC 34 is responsible with commissioning the line system, re-provisioning the line system's OGC's as required following power cycles and certain restart scenarios, line system topology discovery and channel provisioning.

An optical vertex controller OVC 33 is responsible for connection and power control through the wavelength switch. Connection and control of interface transponders, regenerators and wavelength translators also falls within the scope of the OVC.

NCC 30 provides the type of the actual connection (connect through, connect a regenerator, connect access and connect a receiver) and accomplishes the end-to-end light-path set-up by coordinating activities of various OVCs 33 and OLCs 34 along the light path route.

Each individual link can be put in steady state control or open loop mode. A wavelength is changed from open loop (set-up mode, maintenance mode) to steady state control (monitoring mode) after it has been added to the network.

Figure 5A:
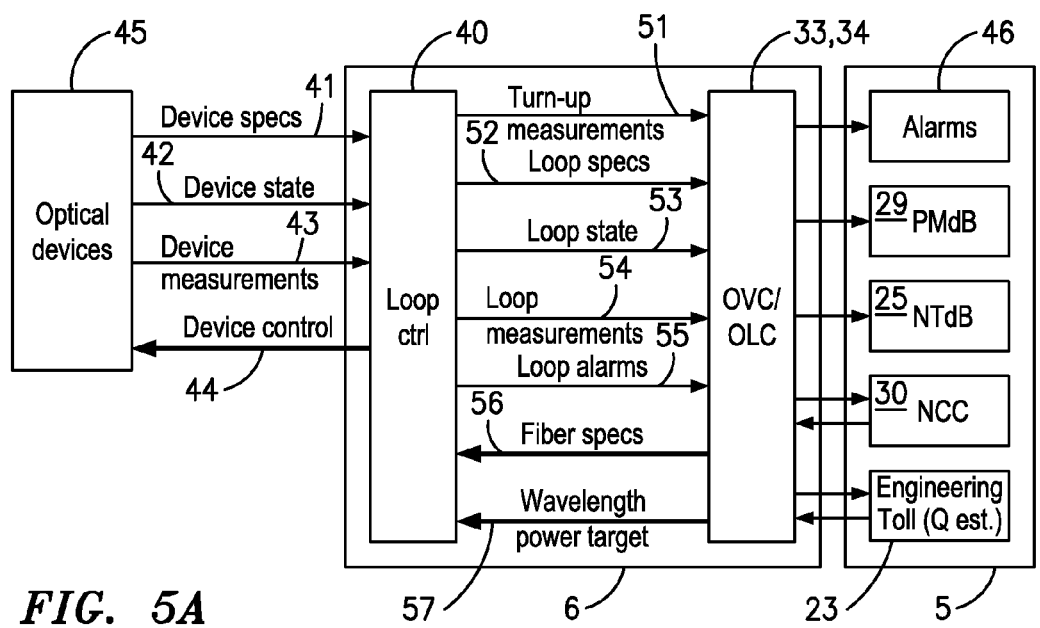
FIG. 5A shows the flow of information between the optical devices, the line control system and the network operating system.

FIG. 5A shows the flow of information between the optical devices 45, the line control system 6 and the network operating system 5. There are three levels of control shown generically on FIG. 5A, namely the loop level control, the OLC/OVC level control and the NOS level control. The loops are designed to allow a level of abstraction at these boundaries, such that changes can be made independently. For example, optical devices 45 store their own specifications, so that it is possible to change the device specifications without changing the loop control 40

At the first level, a loop control 40 receives information, such as device specifications 41, device states 42, device measurements 43 from various optical devices 45 connected in the respective loop. The loop control 40 uses this information to control the device, by sending control information 44. An example of device specification is gain and attenuation range for a wavelength cross-connect.

At the next level, an OLC (optical link controller) 34 manages one or more span loop controls 40. It receives loop turn-up measurements 51, loop specification information 52, loop state information 53, loop measurements 54 and loop alarms 55. The span loop requires for example fiber type and wavelength power targets, so that the OLC 34 sends control information 56 and 57 to the respective loop control 40. The OVC (optical vertex controller) 33 controls the switch and drop loops, that require wavelength power targets 57. Other information, not shown on FIG. 5A, may also be used to control the loops, such as dispersion targets for link commissioning.

Examples of turn-up measurements are Raman gain, path loss, and module specifications including maximum DCM (dispersion compensation module) power. In response, the OLC 34 sends control signals such as link gain distribution, launch power range.

Examples of loop state information are number of active channels, gain degradation, pump power usage. In response, the OLC 34 sends control signals such as requests to modify link gain distribution and available launch power.

At the NOS control level, the OLC/OVCs transmit alarm information shown at 46, supply performance and monitoring data to P&M database 29, and supply topology data to topology database 25.

OLC 34 and OVC 33 are controlled by the NCC 30, as also shown in FIG. 4, and by engineering tool 23.

As indicated above in connection with FIG. 1B, engineering tool 23 estimates optical path Q necessary for path selection and ordering.

The interaction of control loops must create the intended network response to changes, and maintain stability during steady state operation. For example, when routing a path through multiple WXCs 10 and links, the launch power, the gains of the switches and the link gain need to be compatible. This is achieved with a network wide standard, using for example unity gain or a per optical channel serial construction.

Figure 5B:
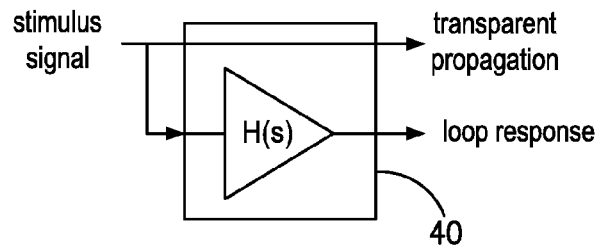
FIG. 5B shows a control loop and stimulus propagation.

FIG. 5B shows a control loop and stimulus propagation. In the first case, the arrival of a stimulus signal at each loop initiates a loop response, according to the loop transfer function H(s). Signals can also propagate transparently through control loops. Transparent propagation creates a situation where many loops can see a stimulus but only one must responds.

Figure 5C:
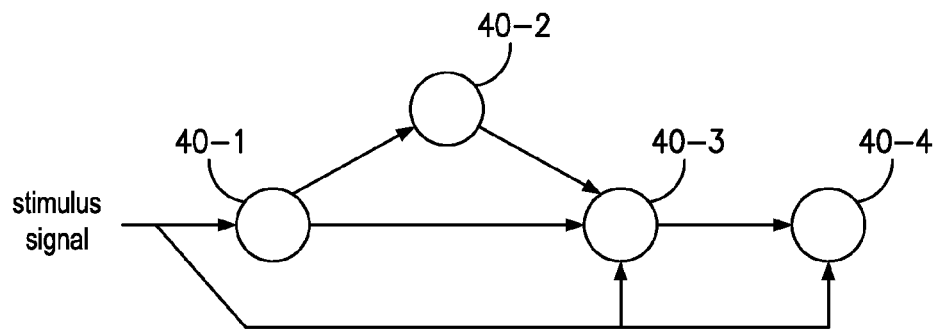
FIG. 5C illustrates how a control signal stimulates a network of control loops.

Signals generated by loop responses branch and converge. Loop interaction is designed to allocate the network response to the appropriate set of loops and in the correct order. Such a scenario is shown in FIG. 5C, which illustrates how a control signal stimulates a network of control loops. A coupling coefficient can be used to describe loop interaction. Unwanted loop interaction must have a low coupling coefficient. The bandwidth and order of interacting loops must be selected as a tradeoff between minimum excursion error and maximum response. The response of a loop must also be chosen to be compatible with the sampling rate of a downstream (or outer) loop.

Figure 6A:
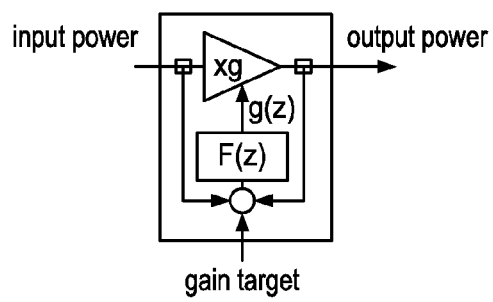
FIG. 6A shows a gain loop.
Figure 6B:
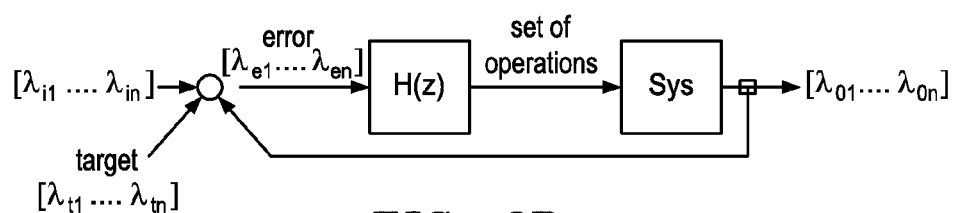
FIG. 6B shows a vector loop.

FIG. 6A shows a gain loop and FIG. 6B shows a vector loop. In the example of the gain loop, input output sampling with a gain target confines the loop to respond to changes within its own domain, and reduces or eliminates the interaction with adjacent loops. The gain control signal is calculated such that the loop behaves as a linear time invariant (LTI) system. A difference in input and output sampling times can couple an unwanted 'common mode' component into the loop response. The coupling coefficient is small if the time difference is small relative to the period of the maximum frequency component of the signal.

A vector loop has a gain or power target for a plurality 'n' of channels, but does not operate as a set of 'n' independent loops. The error signal generated is a vector with 'n' elements. The loop seeks to minimize the energy of the error vector.

We claim:

1. A method of engineering a connection between two terminals of a dynamically reconfigurable photonic network comprising:
    setting-up a path whenever an operational parameter of said path is above a test threshold;
    operating said path in monitoring mode whenever an operational parameter is above a maintenance threshold; and
    servicing said path whenever said operational parameter is under said maintenance threshold.

2. A method as claimed in claim 1, wherein the step of setting-up comprises:
    selecting a physical route for said path based on network topology information, resources specifications and path selection rules;
    assigning 'n' wavelength to said path based on wavelength selection rules and the number 'm' of regenerators connected in said path;
    lighting-up said path and measuring said operational parameter;
    comparing said operational parameter with said test threshold; and
    transiting the state of said path form set-up to established if said operational parameter is above said test threshold.

3. A method as claimed in claim 2, further comprising switching a wavelength-converter/regenerator device into said path whenever said operational parameter is under said test threshold.

4. A method as claimed in claim 2, further comprising selecting a new physical route and switching said path along said new route whenever said operational parameter is under said test threshold.

5. A method as claimed in claim 1, wherein the step of operating said path in a monitoring mode comprises:
    continuously measuring said operational parameter,
    continuously comparing said operational parameter with a maintenance threshold; and
    switching a wavelength-converter/regenerator device into said path whenever said operational parameter is under said maintenance threshold.

6. A method as claimed in claim 5, further comprising transitioning from said operational state to a tearing down state if said operational parameter is under said margin tolerance after said device has been switched into said path.

7. A method as claimed in claim 1, wherein the step of operating said path in a monitoring mode comprises:
    continuously measuring said operational parameter,
    continuously comparing said operational parameter with a maintenance threshold; and
    selecting a new physical route and switching said path along said new route whenever said operational parameter is under said maintenance threshold.

8. A method of engineering a connection over a WDM photonic network with a plurality of flexibility sites, comprising:
    selecting a data communication path for said connection based on network topology information, resources specifications and class of service constraints;
    turning on a source transmitter, a destination receiver and all transmitters and receivers at all flexibility sites along said path;
    increasing gradually the power level of said transmitters while measuring an error quantifier at said destination receiver; and
    maintaining the power at said transmitters at a first level corresponding to a preset error quantifier.

9. A method as claimed in claim 8, further comprising:
    operating said path in a monitoring mode by continuously measuring the error quantifier at said destination receiver;
    increasing the power level of said transmitter from said first level while measuring the error quantifier at said destination receiver; and
    maintaining the power level for said connection at a second level where said error quantifier is below said preset error quantifier.

* * * * *